United States Patent [19]

Ishikawa

[11] Patent Number: 4,752,096

[45] Date of Patent: Jun. 21, 1988

[54] COMBINED STORAGE CABINET AND VENTILATOR FOR AUTOMOTIVE VEHICLE

[75] Inventor: Takeshi Ishikawa, Fujisawa, Japan

[73] Assignee: Nissan Motor Co., Ltd., Yokohama, Japan

[21] Appl. No.: 433,219

[22] Filed: Oct. 7, 1982

[30] Foreign Application Priority Data

Oct. 12, 1981 [JP] Japan .................. 56-163066

[51] Int. Cl.⁴ ............................................. B60R 11/06
[52] U.S. Cl. ................................................ 296/37.16
[58] Field of Search ............. 174/16 R; 361/382, 383; 296/37.1, 37.8, 37.16; 224/42.03 A; 98/1; 312/31, 236, 213

[56] References Cited

U.S. PATENT DOCUMENTS

| | | | |
|---|---|---|---|
| 877,498 | 1/1908 | Gilman | .................. 312/31 |
| 1,496,301 | 10/1922 | Cunningham . | |

FOREIGN PATENT DOCUMENTS

| | | | |
|---|---|---|---|
| 878240 | 7/1949 | Fed. Rep. of Germany | .... 174/16 R |
| 874224 | 4/1942 | France | .................. 296/37.1 |
| 5547412 | 9/1953 | Japan . | |
| 53-49137 | 11/1978 | Japan . | |
| 531113 | 7/1940 | United Kingdom . | |
| 587937 | 5/1947 | United Kingdom . | |

*Primary Examiner*—Joseph Falk

[57] ABSTRACT

A storage cabinet comprises a box and a lid and is formed at the lid with a plurality of air inlets providing communication between the inside of the box and a luggage compartment and also formed at the box with a plurality of air vents providing communication between the inside of the box and an air outlet grille incorporated in a rear pillar. The air inlets are formed in the inclined wall portions of the lid having a zigzag vertical section so that articles contained in the storage cabinet are prevented from being seen through the lid. The box is also provided with inside projections adjacent the air vents so that the articles are prevented from closing the air vents.

9 Claims, 4 Drawing Sheets

4,752,096

COMBINED STORAGE CABINET AND VENTILATOR FOR AUTOMOTIVE VEHICLE

BACKGROUND OF THE INVENTION

1. Field of the Invention

The present invention relates to an automotive vehicle storage cabinet which is combined with a ventilator for ventilating a passenger compartment.

2. Description of the Prior Art

FIGS. 1 to 3 show a prior art luggage compartment structure for a vehicle having a rear door. In a vehicle of this kind, a luggage compartment is not formed separately from a passenger compartment. In the drawing, a storage cabinet is generally indicated at 10 and incorporated in a luggage side member 12. The storage cabinet 10 consists of a box 12a integral with the luggage side member 12 and a lid 14 swingable to open and close the box 12a. The luggage side member 12 is also formed, by the side of the storage cabinet 10, with air vents 16 which form part of a ventilator. Though not shown, the ventilator further includes a cowl top grille, a ventilator grille incorporated in a dash panel and an air outlet grille incorporated in a rear pillar. With the ventilator, outside air flows through the cowl top grille and the ventilator grille into the passenger compartment, and as represented by the arrows 19 in FIG. 3, inside air flows through the air vents 16 out of the passenger compartment and then through the air outlet grille to the outside of the vehicle.

Indicated by the reference numeral 18 is a rear side inner panel which is formed with an opening 18a providing communication between the air vents 16 and the air outlet grille in the rear pillar. The rear side inner panel 18 is joined together with a rear side outer panel 20 to a luggage floor panel 22.

The above described prior art structure is encountered by a drawback that if the storage cabinet 10 is made larger in size, the air vents 16 must be smaller, whereas if the air vents 16 are made larger to increase the ventilation efficiency, the storage cabinet 10 must be smaller in size, resulting in that either must be constructed and arranged in an unsatisfactory state.

SUMMARY OF THE INVENTION

In accordance with the present invention, there is provided an improved storage cabinet which is optimally combined with a ventilator for ventilating a passenger compartment. The storage cabinet of this invention comprises, as usual, a box in the form of a recess provided to a luggage compartment inner side wall and a lid swingable to open and close the box. The lid is formed with an air inlet for providing communication between the inside of the box and the luggage compartment, and the box is formed with an air vent for providing communication between the inside of the box and the outside of the vehicle.

In a more specific embodiment, a plurality of air inlets are formed in the inclined wall portions of the lid having a zigzag vertical section so that articles contained in the storage cabinet are prevented from being seen through the lid. Further, the box is formed with a plurality of air vents and a plurality of inside projections adjacent the air vents so that the articles are prevented from closing the air vents.

With the above structure, it is therefore made possible to attain an enlarged storage cabinet simultaneously with an improved ventilation efficiency.

It is accordingly an object of the present invention to provide an improved storage cabinet for a vehicle which is free from the drawbacks noted above.

It is another object of the present invention to provide an improved stroage cabinet of the above described character which makes it possible to attain an enlargement of itself simultaneously with an improved ventilation efficiency.

It is a further object of the present invention to provide an improved storage cabinet of the above described character which is particularly suited for adoption to an automotive vehicle having a rear door.

BRIEF DESCRIPTION OF THE DRAWINGS

The features and advantages of the vehicle storage cabinet according to the present invention will become more clearly appreciated from the following description taken in conjunction with the accompanying drawings, in which.

DESCRIPTION OF THE PREFERRED EMBODIMENT

Figure 1:
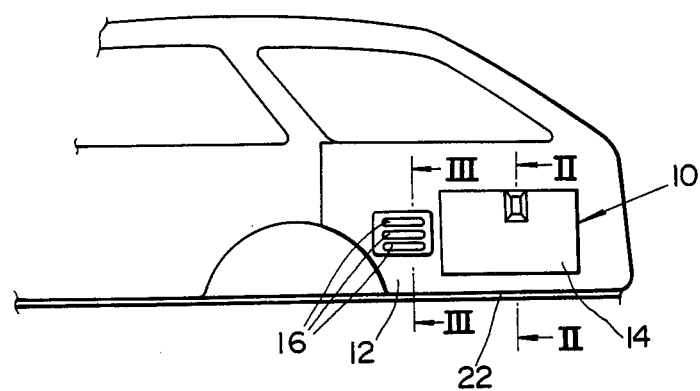
FIG. 1 is a schematic side elevation of a prior art arrangement of a storage cabinet and air vents incorporated in a luggage compartment inner side wall 12.
Figure 2:
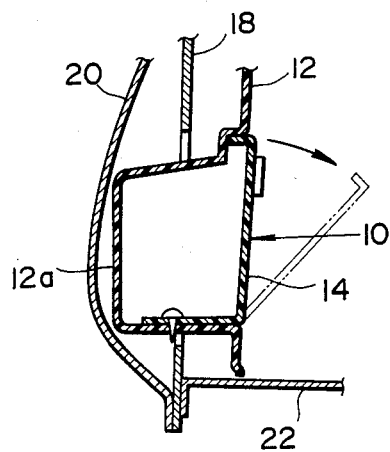
FIG. 2 is a sectional view taken along the line II—II of FIG. 1.

Referring to FIGS. 4 to 8, inclusive, a storage cabinet according to an embodiment of the present invention is generally indicated at 24 and shown to comprise a rectangular box 26 in the form of a recess provided to a luggage compartment inner side wall 28 and having an access opening 30, a lid 32 vertically swingable to open and close the access opening 30 and a latch 34 operative to hold the lid 32 in the closed position thereof. More specifically, the box 26 is made of a synthetic resinous material and consists of a main box member 36 integral with the luggage side finisher 28 and a bottom member 38 placed on a luggage floor panel 40 and screwed as at 42 or otherwise secured to the main box member 36. The main box member 36 includes an upper wall portion 36a arranged opposite to the bottom member 38, a pair of opposite, front and rear side wall portions 36b and 36c, and a laterally outward, back wall portion 36d, defining four sides of the rectangular box 26. Preferably, the lid 32 is formed integral with the bottom member 38 and connected thereto through a thin-walled portion 44 which serves as a hinge operative to allow the lid 32 to swing upwardly and downwardly relative to the box 26. The lid 32 is thus made of a synthetic resinous material and arranged substantially flush with the luggage compartment inner side wall 28 when put in its closed position.

Figure 6:
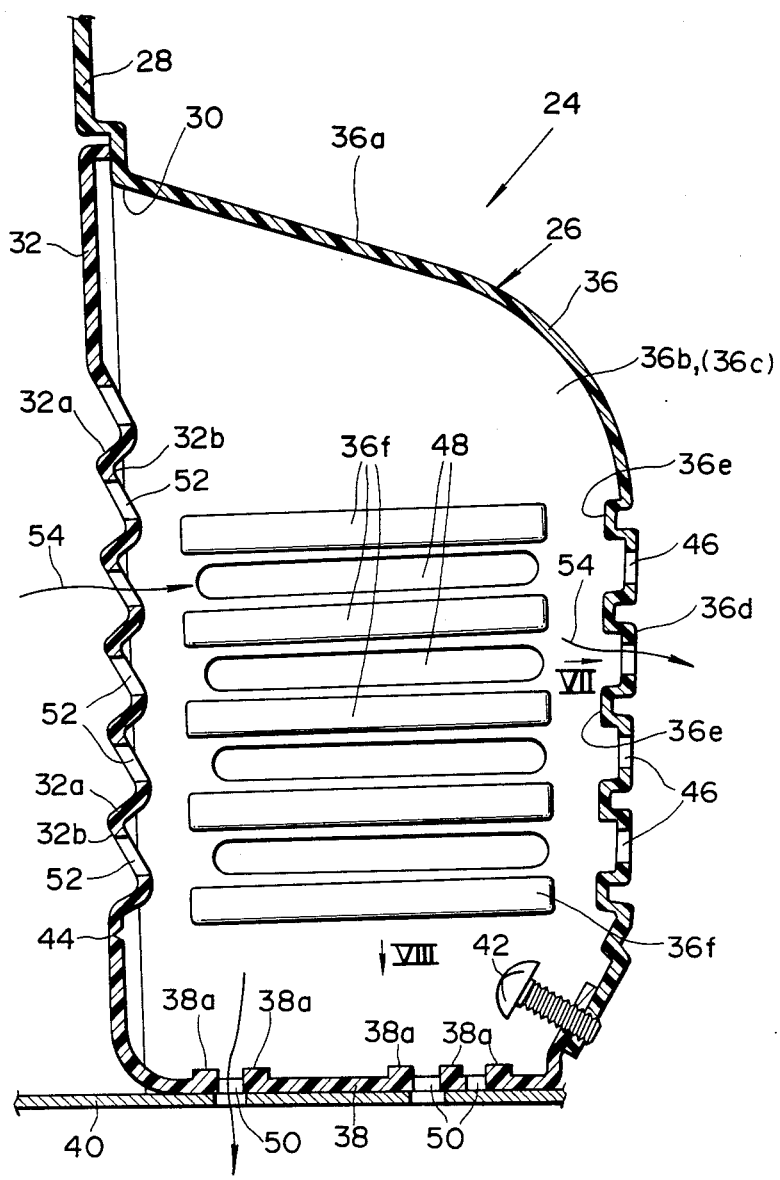
FIG. 6 is a sectional view taken along the line VI—VI of FIG. 5.
Figure 7:
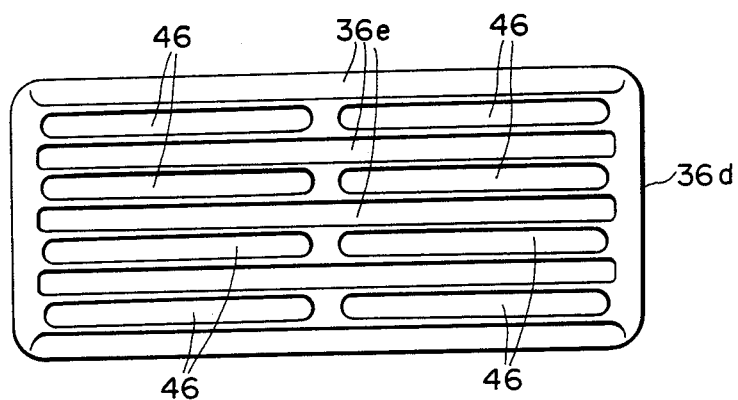
FIG. 7 is a view taken along the arrow "VII" of FIG. 6.
Figure 8:
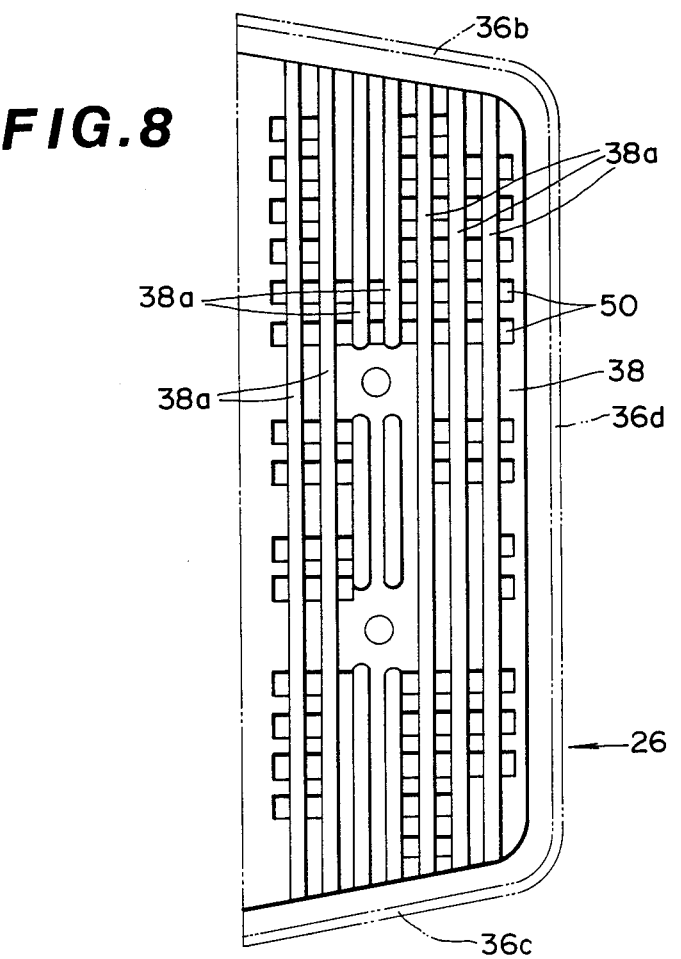
FIG. 8 is a view taken along the arrow "VIII" of FIG. 6.

As seen from FIG. 6, the back wall portion 36d of the main box member 36 is formed with a plurality of parallel, long, narrow, horizontal air vents 46 and in part shaped to project at locations adjacent the air vents 46 toward the inside of the box 26. More specifically, the back wall portion 36d is formed with a plurality of parallel, long, narrow, horizontal projections 36e projecting toward the inside of the box 26 and also formed with the air vents 46 between the adjacent two projections 36e, respectively. In other words, the back wall portion 36d is shaped into a partially undulating wall including alternate projections and recessed portions when viewed from the inside of the box 26 and formed at the recessed portions with the air vents 46. Similarly, each of the front and rear side wall portions 36b and 36c is formed with a plurality of parallel, long, narrow, horizontal projections 36f and a plurality of parallel, long, narrow, horizontal air vents 48 between the adjacent two projections 36f, respectively. Further, the bottom member 38 is similarly formed with a plurality of inward projections 38a and a plurality of air vents 50. The air vents 50 is formed in the recessed portions adjacent the projections 38a and communicated through openings (no numeral) formed in the luggage floor panel 38 with the outside of the vehicle as will be described hereinafter.

Figure 3:
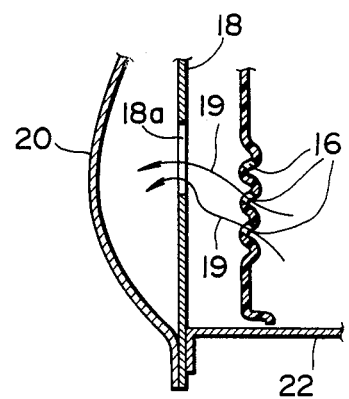
FIG. 3 is a sectional view taken along the line III—III of FIG. 1.
Figure 4:
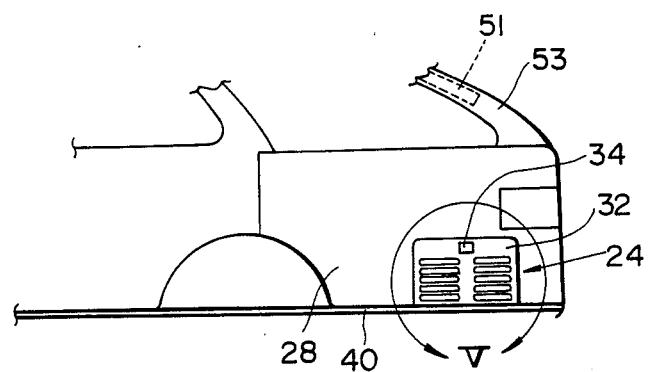
FIG. 4 is a view similar to FIG. 1 but shows an arrangement of a storage cabinet and air vents incorporated in a luggage compartment inner side wall 12 according to the present invention.
Figure 5:
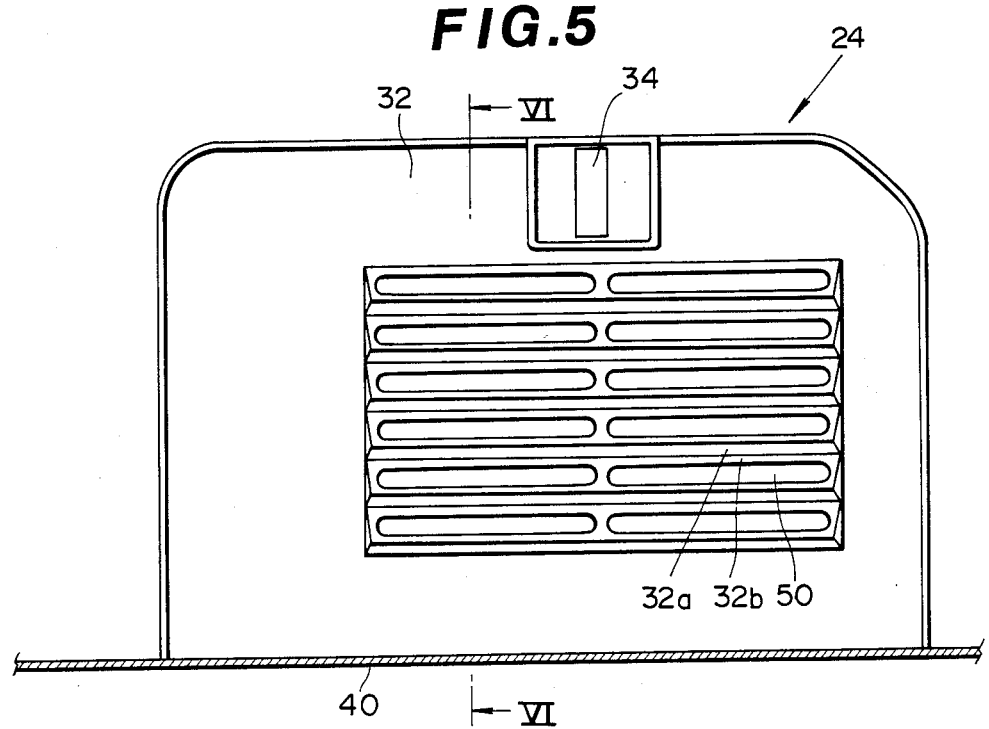
FIG. 5 is an enlarged view of the storage cabinet portion indicated by the circle "V" of FIG. 4.

The lid 32 is generally flat and in part shaped into a saw-toothed or zigzag vertical section including alternate first and second inclined wall sections 32a and 32b which decline outwardly and inwardly of the box 26, respectively. The first and second inclined wall sections 32a and 32b are long, narrow, horizontally elongated wall sections, and the second wall sections 32b are formed with long, narrow, horizontally elongated air inlets 52, respectively. The air inlets 52 are communicated through the air vents 46, 48 and 50 and further through, though not shown, the space between inner and outer rear side panels (refer to FIG. 3) with an air outlet grille 51 incorporated in a rear pillar 53 in a conventional manner. For efficient ventilation, the total sectional area of the air vents 46, 48 and 50 is made larger than that of the air inlets 52.

With the foregoing structure, air is taken by the ram effect into the storage cabinet 24 through the air inlets 52 and then flows out of the storage cabinet 24 through the air vents 46, 48 and 50 toward the air outlet grille 51 incorporated in the rear pillar 53 to be vented into the open air, as represented by the arrows 54 in FIG. 6. In this connection, it is to be noted that articles which are put in the storage cabinet 24 cause no harm to the above described ventilation since the articles are effectively prevented from closing the air vents 46, 48 and 50 due to the excellent arrangements of the projections 36e, 36f and 38a and the air vents 46, 48 and 50 according to the present invention. Furthermore, it is to be noted that the first inclined wall sections 32a effectively conceal the articles contained in the storage cabinet 24 from sight.

From the foregoing, it is to be understood that according to the present invention either of a storage cabinet and an air inlet grille which are both to be incorporated in a luggage compartment inner side wall can be made larger in size without sacrificing the other, making it possible, for example, to attain a spacious storage cabinet without reducing the ventilation efficiency.

Obviously, many variations and modifications of the present invention are possible in light of the above teachings. It is, therefore, to be understood that within the scope of the appended claims, the invention may be practiced otherwise than as specifically described.

What is claimed is:

1. A storage cabinet for a vehicle having a luggage compartment inner side wall defining part of a luggage compartment, comprising:
   a box in the form of a recess provided in said side wall;
   a lid swingable to open and close said box;
   an air inlet formed in said lid to provide communication between the luggage compartment and the inside of said box; and
   an air vent formed in said box to provide communication between the inside of said box and the outside of the vehicle.

2. A storage cabinet as set forth in claim 1, wherein said lid is generally flat and in part shaped into a zigzag vertical section including alternate first and second inclined wall sections which decline outwardly and inwardly of said box, respectively, said first and second inclined wall sections being long, narrow, horizontally elongated wall sections, and wherein said second inclined wall sections are formed with a plurality of said air inlets which are long, narrow, horizontally elongated openings, respectively.

3. A storage cabinet as set forth in claim 1, wherein the sectional area of said air vent is larger than that of said air inlet.

4. A storage cabinet as set forth in claim 1, wherein said vehicle also has a rear pillar and an air outlet grille incorporated in said rear pillar, and wherein said air vents are communicated with said air outlet grille.

5. A storage cabinet as set forth in claim 1, further comprising a latch operative to hold said lid in its closed position.

6. A storage cabinet for an automotive vehicle having a luggage compartment inner side wall defining part of a luggage compartment, comprising:
   a box in the form of a recess provided in said side wall;
   a lid swingable to open and close said box;
   a plurality of air inlets formed in said lid to provide communication between the luggage compartment and the inside of said box; and
   a plurality of air vents formed in said box to provide communication between the inside of said box and the outside of the vehicle;
   the inside of said box being in part shaped to project at locations adjacent said air vents inwardly of said box to prevent any article in said box from closing said vents.

7. A storage cabinet as set forth in claim 6, wherein said box is substantially rectangular and comprises a main box member and a bottom member secured to said main box member, said main box member including an upper wall portion arranged opposite to said bottom member, a pair of opposite, front and rear side wall portions and a laterally outward, back wall portion, and wherein said main box member wall portions are respectively formed with a plurality of parallel, long, narrow, horizontal projections projecting inwardly of said box and also formed with said air vents each being disposed between adjacent projections.

8. A storage cabinet as set forth in claim 7, wherein said lid and said box are made of a synthetic resinous material and formed integral with each other and interconnected through a thin-wall portion which serves as a hinge.

9. A storage cabinet as set forth in claim 6, wherein said bottom member is formed with a plurality of parallel, long, narrow projections projecting inwardly of said box and said air vents adjacent said projections.

* * * * *